(12) United States Patent
Offenhuber et al.

(10) Patent No.: US 9,062,807 B2
(45) Date of Patent: Jun. 23, 2015

(54) METHOD FOR IDENTIFYING A BLOCKAGE OF A DOSING VALVE OF AN SCR CATALYTIC CONVERTER SYSTEM

(71) Applicant: Robert Bosch GmbH, Stuttgart (DE)

(72) Inventors: Michael Offenhuber, Adnet (AT);
Stefan Lorengel, Vienna (AT);
Godehard Nentwig, Stuttgart (DE);
Sebastian Kanne, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 13/747,546

(22) Filed: Jan. 23, 2013

(65) Prior Publication Data
US 2013/0186470 A1 Jul. 25, 2013

(30) Foreign Application Priority Data
Jan. 23, 2012 (DE) .......................... 10 2012 200 917

(51) Int. Cl.
| | | |
|---|---|---|
| *F01N 3/00* | (2006.01) | |
| *F16L 55/00* | (2006.01) | |
| *F01N 3/20* | (2006.01) | |
| *F01N 11/00* | (2006.01) | |

(52) U.S. Cl.
CPC ................. *F16L 55/00* (2013.01); *F01N 3/208* (2013.01); *Y02T 10/47* (2013.01); *F01N 11/00* (2013.01); *F01N 2610/02* (2013.01); *F01N 2610/148* (2013.01); *F01N 2900/1808* (2013.01); *F01N 2550/05* (2013.01); *Y02T 10/24* (2013.01)

(58) Field of Classification Search
CPC ...... F01N 3/208; F01N 11/00; F01N 2550/05; F01N 2610/02; F01N 2610/148; F01N 2900/1808; F16L 55/00
USPC ............................................................ 60/277
See application file for complete search history.

(56) References Cited

U.S. PATENT DOCUMENTS

| | | | |
|---|---|---|---|
| 7,930,116 B2 * | 4/2011 | Huebner | 702/50 |
| 2010/0005871 A1 * | 1/2010 | Kitazawa | 73/114.69 |
| 2010/0071349 A1 * | 3/2010 | Kitazawa | 60/277 |
| 2011/0099983 A1 * | 5/2011 | Ohno | 60/277 |
| 2011/0107742 A1 * | 5/2011 | Igarashi et al. | 60/277 |
| 2011/0146242 A1 * | 6/2011 | Kawase | 60/277 |

* cited by examiner

*Primary Examiner* — Jason Shanske
(74) *Attorney, Agent, or Firm* — Michael Best & Friedrich LLP

(57) ABSTRACT

The invention relates to a method for identifying a blockage of one or more spray openings of a dosing valve of an SCR catalytic converter system. Said method comprises the closure of the dosing valve, the determination of a first pressure profile in the hydraulic system in the delivery module of the SCR catalytic converter system, and the determination of the stiffness of the hydraulic system from the first pressure profile. The dosing valve is subsequently opened, a second pressure profile in the hydraulic system in the delivery module of the SCR catalytic converter system is determined, and a blockage of one or more spray openings of the dosing valve is determined from the stiffness and from the second pressure profile.

8 Claims, 3 Drawing Sheets

METHOD FOR IDENTIFYING A BLOCKAGE OF A DOSING VALVE OF AN SCR CATALYTIC CONVERTER SYSTEM

BACKGROUND OF THE INVENTION

The present invention relates to a method for identifying a blockage of one or more spray openings of a dosing valve of an SCR catalytic converter system. The invention also relates to a computer program which performs all of the steps of the method according to the invention when executed on a computer. The invention also relates to a computer program product with program code, which is stored on a machine-readable carrier, for carrying out the method when the program is executed on a computer or control unit.

To comply with ever more stringent exhaust-gas legislation, it is necessary to reduce nitrogen oxides ($NO_x$) in the exhaust gas of internal combustion engines, in particular of diesel engines. For this purpose, it is known to arrange an SCR (selective catalytic reduction) catalytic converter in the exhaust-gas region of internal combustion engines. In an SCR catalytic converter, nitrogen oxides in the exhaust gas of the internal combustion engine are reduced, in the presence of a reducing agent, to form nitrogen. In this way, the fraction of nitrogen oxide in the exhaust gas can be reduced considerably. For the reaction to proceed, ammonia ($NH_3$) is required which is admixed to the exhaust gas. As reducing agents, use is thus made of $NH_3$ or reagents which release $NH_3$. In general, for this purpose, use is made of an aqueous urea solution (AUS) which is injected into the exhaust tract downstream of the SCR catalytic converter. Ammonia, which acts as a reducing agent, is formed from said solution. A 32.5% aqueous urea solution is commercially available under the trade name AdBlue®.

A dosing system for an SCR catalytic converter according to the prior art comprises a reducing agent tank, a delivery module and a dosing valve. The reducing agent solution is transported from the reducing agent tank to the dosing valve by the delivery module. The delivery module comprises a pump which is connected by means of lines to the dosing valve and if appropriate to a reducing agent return line. Said line system is referred to as hydraulic system.

The "California Air Resources Board" (CARB) demands the identification of a dosing quantity deviation in the catalytic converter system which leads to the exceedance of a defined nitrogen oxide emissions limit of the exhaust system of a diesel engine. This may occur in particular as a result of blockage of one or more spray openings of the dosing valve of an SCR catalytic converter system. It is thus necessary to make a distinction between demanded dosing mass, and the dosing mass actually dosed, of the reducing medium AdBlue®. In particular as a result of the provision of a reducing agent return line in the delivery module of the SCR catalytic converter and owing to the influence of the air volume enclosed in the system on pressure profiles during the dosing of certain masses of the reducing agent AdBlue®, an identification of dosing quantity deviations is not possible by evaluation of the gradient of pressure profiles in the hydraulic system or from a deviation in the pump rotational speed.

To identify dosing quantity deviations of the aqueous urea solution owing to a blockage of one or more spray openings of a dosing valve, the use of an additional mass flow sensor in the hydraulic system of the SCR catalytic converter is therefore necessary.

SUMMARY OF THE INVENTION

The method according to the invention for identifying a blockage of one or more spray openings of a dosing valve of an SCR catalytic converter system comprises the closure of the dosing valve, the determination of a first pressure profile in the hydraulic system in a delivery module of the SCR catalytic converter system, and the determination of the stiffness of a hydraulic system in a delivery module of the SCR catalytic converter system from the first pressure profile. The dosing valve is subsequently opened, a second pressure profile in the hydraulic system in the delivery module of the SCR catalytic converter system is determined, and a blockage of one or more spray openings of the dosing valve is determined from the stiffness and from the second pressure profile. In this way, the method according to the invention permits the identification of a blockage of a dosing valve, without a mass flow sensor being required in the hydraulic system for this purpose.

To determine the stiffness, it is possible according to the invention, before the opening of the dosing valve, for the motor of a delivery pump of the SCR catalytic converter system to be stopped, and for the stiffness to be determined from the first pressure profile in the hydraulic system. It is alternatively also possible, before the opening of the dosing valve, for a rotational speed step of the motor of the delivery pump of the SCR catalytic converter system to be generated, and for the stiffness to subsequently be determined likewise from the first pressure profile in the hydraulic system. In both alternatives, it is preferable for the stiffness to be determined, with the assistance of a model, from the first pressure profile in the hydraulic system.

By determining the second pressure profile in the hydraulic system in the delivery module of the SCR catalytic converter system after the opening of the dosing valve, it is possible to deduce the cross-sectional area of the dosing valve from said pressure profile and from the stiffness. By comparing the cross-sectional area thus determined with the cross-sectional area of an unblocked dosing valve, it can be deduced whether a blockage of one or more spray openings of the dosing valve is present. To determine the second pressure profile, it is preferable according to the invention for the motor of the delivery pump of the SCR catalytic converter system to be stopped after the opening of the dosing valve. It is alternatively preferable for a rotational speed step of the motor of the delivery pump of the SCR catalytic converter system to take place after the opening of the dosing valve.

The computer program according to the invention can perform all of the steps of the method according to the invention when executed on a computer. This permits the implementation of the method according to the invention in an existing SCR catalytic converter system without the need to make structural modifications thereto. For this purpose, the computer program product according to the invention has program code which is stored on a machine-readable carrier and which serves for carrying out the method according to the invention when the program is executed on a control unit or computer.

BRIEF DESCRIPTION OF THE DRAWINGS

Exemplary embodiments of the invention are illustrated in the drawings and are explained in more detail in the following description.

DETAILED DESCRIPTION

Figure 1:
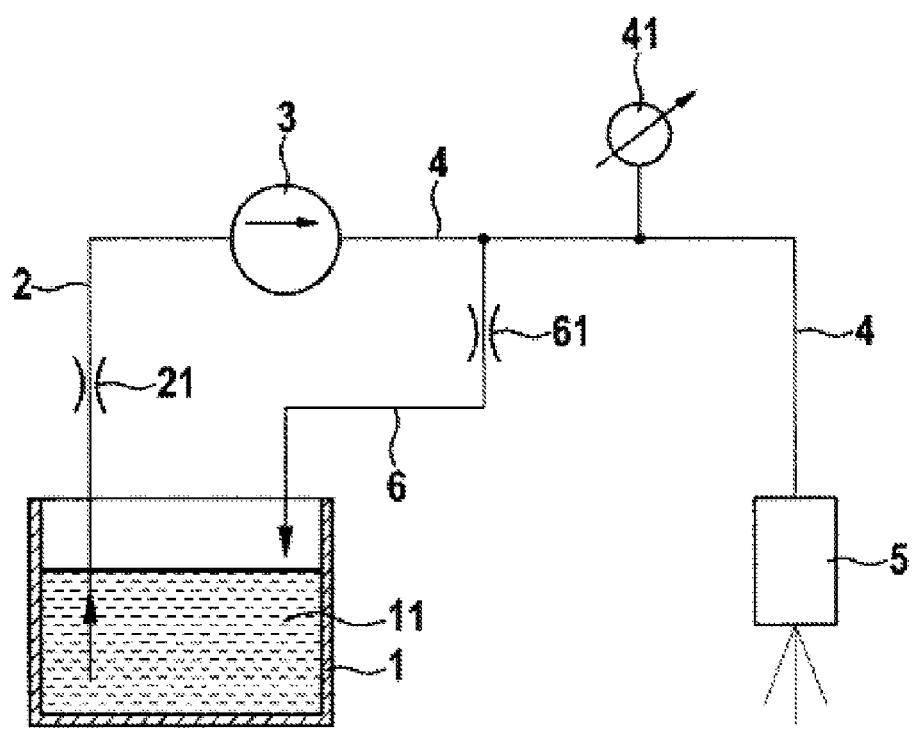
FIG. 1 shows an SCR catalytic converter system according to the prior art.

FIG. 1 shows the delivery module of an SCR catalytic converter system according to the prior art. A reducing agent tank 1 which contains aqueous urea solution 11 is connected to a delivery pump 3 by means of a suction line 2 which comprises a first throttle 21. The delivery pump 3 is connected via a hydraulic system 4 to a dosing valve 5. In the hydraulic system 4 there is arranged a pressure sensor 41. From the hydraulic system 4 there branches off a return line 6 which comprises a second throttle 61 and which ends in the reducing agent tank 1. During dosing operation, the delivery pump 3 delivers reducing agent solution 11 from the reducing agent tank 1 through the suction line 2 and the hydraulic system 4 to the dosing valve 5, which doses the aqueous urea solution 11 into an SCR catalytic converter.

Figure 2:
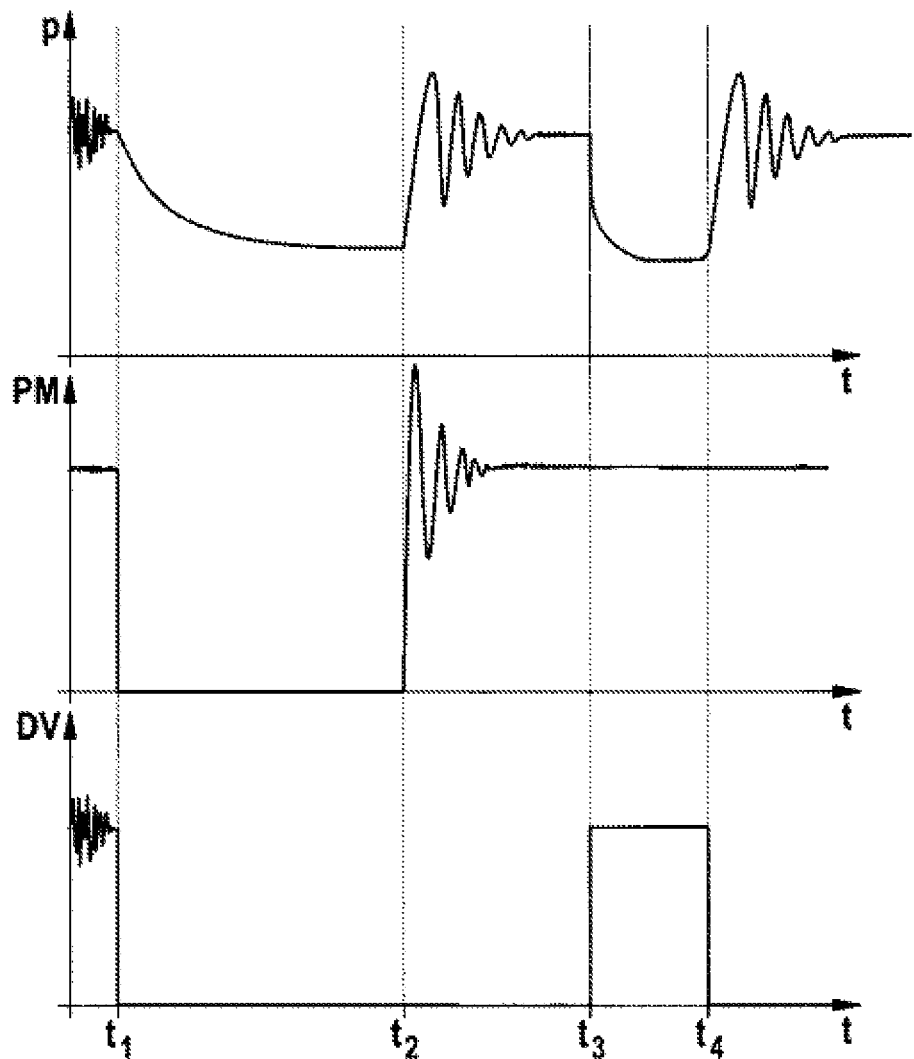
FIG. 2 shows the pressure profile in the hydraulic system of the SCR catalytic converter system according to FIG. 1, the actuation of the delivery pump, and the actuation of the dosing valve in a method according to one embodiment of the invention.

FIG. 2 shows the profile of the pressure p in the hydraulic system 4 of the SCR catalytic converter system, the actuation PM of the pump motor of the delivery pump 3 in the delivery module of the SCR catalytic converter system, and the actuation DV of the dosing valve 5 of the SCR catalytic converter system, in each case as a function of the time t, for one embodiment of the invention. In a time period $t_0$ to $t_1$, the pump motor is actuated constantly. Depending on the demand of the SCR catalytic converter, the dosing valve is actuated to a greater or lesser degree so as to dose aqueous urea solution 11 into the SCR catalytic converter. The pressure in the hydraulic system 4 of the SCR catalytic converter system fluctuates analogously to the actuation of the dosing valve 5. At the time $t_1$, an internal combustion engine which is connected to the SCR catalytic converter system is shut off, and there is no longer a demand for aqueous urea solution 11. Therefore, both the delivery pump 3 and also the dosing valve 5 are not actuated. The pressure in the hydraulic system 4 gradually falls via the second throttle 61. At the time $t_2$, the method according to the invention for identifying a blockage of one or more spray openings of the dosing valve 5 is then started. For this purpose, by actuation of the pump motor, a rotational speed step of the pump motor is effected, which leads to an abrupt rise in the pressure p in the hydraulic system 4 to its maximum value $p_{max}$. Here, the dosing valve 5 remains closed. From the first pressure profile, the stiffness c of the hydraulic system 4 is determined in a model-based manner from the pressure $p(t_1)$ at the time $t_1$ and the pressure $p(t_2)$ at the time $t_2$ as per formula 1:

$$c = \frac{A_{61}}{\sqrt{2\rho}} \cdot \frac{t_2 - t_1}{\sqrt{p(t_1)} - \sqrt{p(t_2)} - \sqrt{p_{max}} \cdot \ln\left(\frac{\sqrt{p(t_2)} - \sqrt{p_{max}}}{\sqrt{p(t_1)} - \sqrt{p_{max}}}\right)} \quad \text{(Formula 1)}$$

Here, $A_{61}$ denotes the cross-sectional area of the second throttle 61, and $\rho$ denotes the density of the aqueous urea solution.

At the time $t_3$, the pump motor is deactivated and the dosing valve 5 is opened. This results in a drop in pressure p in the hydraulic system 4 via the dosing valve 5 and via the second throttle 61. The dosing valve 5 is subsequently closed again at the time $t_4$. From said second pressure profile and from the already calculated stiffness c, a model-based determination is carried out, as per formula 2, based on the pressure $p(t_3)$ at the time $t_3$ and the pressure $p(t_4)$ at the time $t_4$, as to whether a blockage of one or more spray openings of the dosing valve 5 is present:

$$A_5 = c \cdot \frac{p(t_3) - p(t_4)}{\sqrt{\frac{p(t_3) + p(t_4)}{\rho}} \cdot (t_4 - t_3)} + A_{61} \cdot \sqrt{\frac{2 \cdot p(t_3)}{p(t_3) + p(t_4)}} \quad \text{(Formula 2)}$$

Here, $A_5$ denotes the cross-sectional area of the dosing valve 5. By comparing the cross-sectional area $A_5$ thus determined with the cross-sectional area of an unblocked dosing valve 5, it can be deduced whether a blockage of one or more spray openings of the dosing valve 5 is present.

The pump motor of the delivery pump 3 is subsequently actuated constantly. When the pressure p has assumed a constant value again, the SCR catalytic converter system is ready for a new dosing of aqueous urea solution 11.

Figure 3:
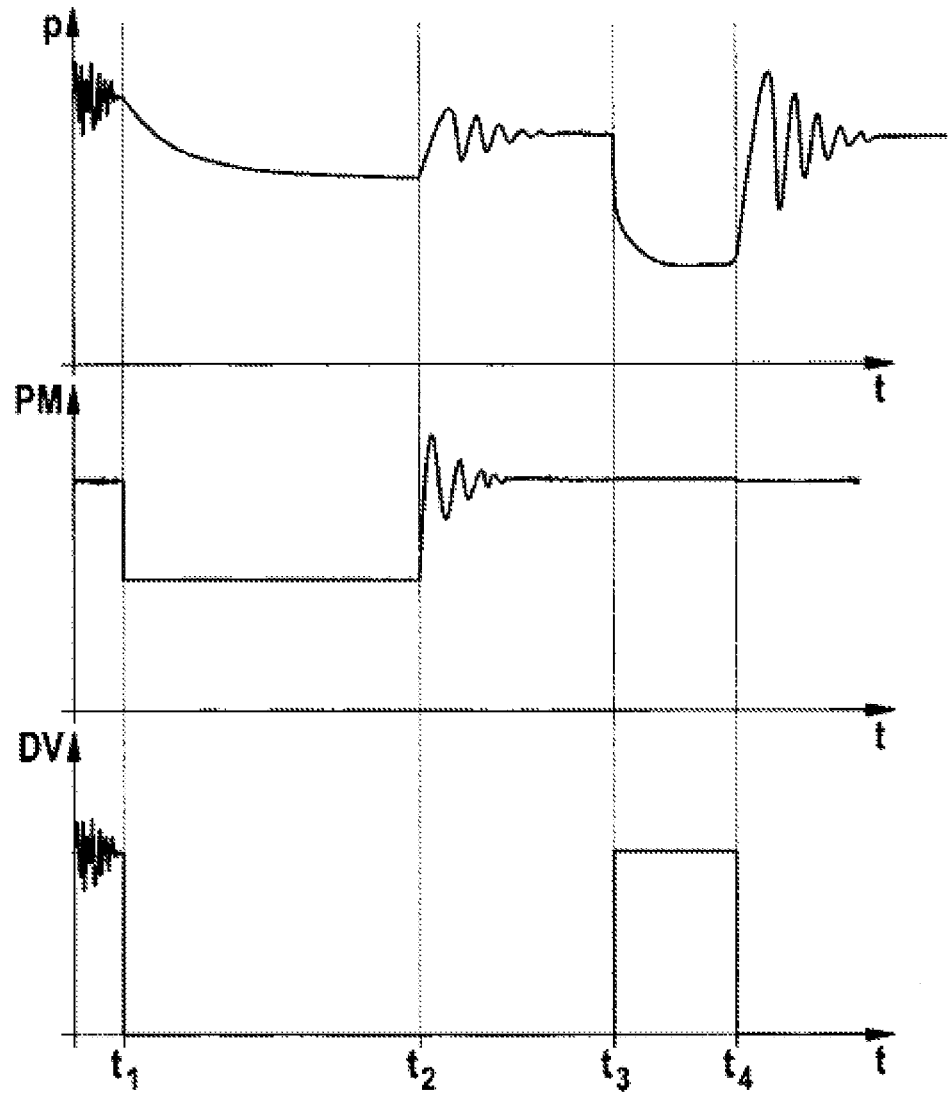
FIG. 3 shows the pressure profile in the hydraulic system of the SCR catalytic converter system according to FIG. 1, the actuation of the delivery pump, and the actuation of the dosing valve in another embodiment of the method according to the invention.

FIG. 3 shows the profile of pressure p, pump motor actuation PM and dosing valve actuation DV in another embodiment of the method according to the invention. As in the first embodiment, it is also the case in the second embodiment of the method according to the invention that the delivery pump 3 is actuated constantly up until the time $t_1$, and the dosing valve 5 is actuated as a function of the reducing agent demand of the SCR catalytic converter. The pressure p in the hydraulic system 4 fluctuates analogously to the actuation of the dosing valve 5. Between the times $t_1$ and $t_2$, the dosing valve 5 is no longer actuated, but by contrast to the first embodiment of the method, the pump motor continues to be actuated, albeit with a lower rotational speed than before the time $t_1$. Here, too, a drop in the pressure p in the hydraulic system takes place via the second throttle 61, wherein the pressure p however falls to a value higher than that in the first embodiment of the method. At the time $t_2$, a rotational speed step of the pump motor to the rotational speed before the time $t_1$ takes place, which leads to a rise in the pressure p, said pressure rise however being less pronounced than in the first embodiment of the method. It is however the case here, too, that the stiffness of the hydraulic system 4 can be determined as per formula 1 from the first pressure profile. Subsequently, while the pump motor is being actuated again constantly, the dosing valve 5 is opened, resulting in a pressure drop in the hydraulic system 4 via the second throttle 61 and via the dosing valve 5. From said second pressure profile, in conjunction with the known stiffness, it is possible as per formula 2 to deduce the presence of a blockage of one or more spray openings of the dosing valve 5. At the time $t_4$, the dosing valve 5 is closed again, such that the pressure p in the hydraulic system 4 can rise again. When said pressure has assumed a constant value, the system is again ready for a dosing of urea-water solution 11.

The invention claimed is:
1. A method for identifying a blockage of one or more spray openings of a dosing valve (5) of an SCR catalytic converter system including a control unit, a hydraulic system (4), and the dosing valve (5), comprising:
   closing, by the control unit, the dosing valve (5);
   determining, by the control unit, after the closing of the dosing valve, a first pressure profile in the hydraulic system (4) of the SCR catalytic converter system;

determining, by the control unit, stiffness of a the hydraulic system (4) of the SCR catalytic converter system from the first pressure profile;

opening, by the control unit, the dosing valve (5);

determining, by the control unit, after the opening of the dosing valve, a second pressure profile in the hydraulic system (4) of the SCR catalytic converter system; and determining, by the control unit, a blockage of one or more spray openings of the dosing valve (5) based on the determined stiffness and the second pressure profile.

2. The method according to claim 1, characterized in that, before the opening of the dosing valve (5), a motor of a delivery pump (3) of the SCR catalytic converter system is stopped, and the stiffness is determined from a pressure profile in the hydraulic system (4).

3. The method according to claim 2, characterized in that the stiffness is determined, with the assistance of a model, from the pressure profile in the hydraulic system (4).

4. The method according to claim 1, characterized in that, before the opening of the dosing valve (5), a rotational speed step of a motor of a delivery pump (3) of the SCR catalytic converter system takes place, and the stiffness is determined from a pressure profile in the hydraulic system (4).

5. The method according to claim 4, characterized in that the stiffness is determined, with the assistance of a model, from the pressure profile in the hydraulic system (4).

6. The method according to claim 1, characterized in that, after the opening of the dosing valve (5), a motor of a delivery pump (3) of the SCR catalytic converter system is stopped.

7. The method according to claim 1, characterized in that, after the opening of the dosing valve (5), a rotational speed step of a motor of a delivery pump (3) of the SCR catalytic converter system takes place.

8. A non-transitory computer readable medium comprising program code, for execution by a control unit of an SCR catalytic converter system including a hydraulic system (4), and a dosing valve (5), the program code causing the control unit to close the dosing valve (5);

determine, after the dosing valve has been closed, a first pressure profile in the hydraulic system (4) of the SCR catalytic converter system;

determine a stiffness of the hydraulic system (4) of the SCR catalytic converter system from the first pressure profile;

open the dosing valve (5);

determine, after the dosing valve has been opened, a second pressure profile in the hydraulic system (4) of the SCR catalytic converter system; and determine a blockage of one or more spray openings of the dosing valve (5) based on the determined stiffness and the second pressure profile.

* * * * *